US012774197B2

(12) United States Patent
Ødegård

(10) Patent No.: US 12,774,197 B2
(45) Date of Patent: Oct. 27, 2026

(54) CRANE

(71) Applicant: Seaonics AS, Ålesund (NO)

(72) Inventor: Jarle Sigurd Ødegård, Trondheim (NO)

(73) Assignee: Seaonics AS, Ålesund (NO)

( * ) Notice: Subject to any disclaimer, the term of this patent is extended or adjusted under 35 U.S.C. 154(b) by 270 days.

(21) Appl. No.: 18/565,469

(22) PCT Filed: Jun. 3, 2022

(86) PCT No.: PCT/NO2022/050126
§ 371 (c)(1),
(2) Date: Nov. 29, 2023

(87) PCT Pub. No.: WO2022/260528
PCT Pub. Date: Dec. 15, 2022

(65) Prior Publication Data
US 2024/0253954 A1 Aug. 1, 2024

(30) Foreign Application Priority Data
Jun. 11, 2021 (NO) .................................... 20210761

(51) Int. Cl.
*B66C 23/52* (2006.01)
*B63B 27/10* (2006.01)
(Continued)

(52) U.S. Cl.
CPC .............. *B66C 23/52* (2013.01); *B63B 27/10* (2013.01); *B66C 23/163* (2013.01); *B66C 23/706* (2013.01); *B66C 23/82* (2013.01)

(58) Field of Classification Search
CPC ....... B66C 23/04; B66C 23/163; B66C 23/52; B66C 23/706; B66C 23/82; B66C 23/14; B63B 27/10
See application file for complete search history.

(56) References Cited

U.S. PATENT DOCUMENTS 3,913,756 A 10/1975 Barron et al.
4,596,336 A 6/1986 Zwagerman
(Continued)

FOREIGN PATENT DOCUMENTS

CH 332946 A * 9/1958 ............. B66C 23/10
CN 109185409 A 1/2019
(Continued)

OTHER PUBLICATIONS

CH 332946A Machine Translation (Year: 1958).*
(Continued)

*Primary Examiner* — Robert W Hodge
*Assistant Examiner* — Juan J Campos, Jr.
(74) *Attorney, Agent, or Firm* — Knobbe, Martens, Olson & Bear, LLP

(57) ABSTRACT

A crane including a main boom having a first end portion and a second end portion, and being supported by a support structure via a hinged connection whereby the main boom is pivotable in a vertical plane. A pivoting assembly is arranged below the main boom, wherein the pivoting assembly includes an electric motor-and-winch assembly, a sheave assembly, and one or more drive wires extending between the motor-and-winch assembly and the sheave assembly.

19 Claims, 2 Drawing Sheets

(51) Int. Cl.
*B66C 23/16* (2006.01)
*B66C 23/70* (2006.01)
*B66C 23/82* (2006.01)

(56) References Cited

U.S. PATENT DOCUMENTS

| | | | | |
|---|---|---|---|---|
| 6,026,970 | A * | 2/2000 | Sturm, Jr. | B66C 23/706 52/118 |
| 8,104,631 | B2 * | 1/2012 | Stegemann | B66C 23/06 212/179 |
| 9,073,734 | B1 | 7/2015 | Cates et al. | |
| 9,643,689 | B1 * | 5/2017 | McKenzie | B63B 27/16 |
| 2016/0152451 | A1 * | 6/2016 | Vestre | B66C 23/52 254/323 |
| 2019/0176938 | A1 | 6/2019 | Prins | |

FOREIGN PATENT DOCUMENTS

| | | | | |
|---|---|---|---|---|
| CN | 11606218 | A | 9/2020 | |
| EP | 0949184 | A2 | 10/1999 | |
| EP | 3 546 335 | A1 | 10/2019 | |
| GB | 1 390 206 | | 4/1975 | |
| GB | 1550072 | A * | 8/1979 | B66C 23/706 |
| JP | 2820912 | B2 * | 11/1998 | |
| WO | WO 2019/240585 | A1 | 12/2019 | |
| WO | WO 2020/065770 | A1 | 4/2020 | |

OTHER PUBLICATIONS

JPH 09142783A, app version of JP 2820912 B2, Machine Translation (Year: 1998).*

Extend European Search Report dated Mar. 31, 2025 in Application No. 22820632.2, 7 pages.

Norwegian Search Report for Norwegian Patent Application No. 20210761, dated Jan. 26, 2024, in 2 pages.

International Search Report and Written Opinion for International PCT Application No. PCT/NO2022/050126 mailed Sep. 8, 2022 in 12 pages.

Norwegian Search Report for Norwegian Patent Application No. 20210761 dated Jan. 6, 2022 in 2 pages.

* cited by examiner

CRANE

TECHNICAL FIELD OF THE INVENTION

The invention concerns a crane of the type defined in the preamble of claim 1. The invented crane is particularly useful on a ship or other vessel.

BACKGROUND OF THE INVENTION

Design of ship's deck cranes is often a compromise between crane load capacity, size, and deck footprint. Space is often limited on a ship's deck. A deck crane typically comprises a superstructure connected to a pedestal via a slewing gear. The superstructure comprises one or more crane arms that are movable via hydraulic cylinders. A tower normally extends above the crane arms, for movably supporting the crane arms via hydraulic cylinders and/or wire ropes. The crane arms may be telescopically connected or hingedly connected ("knuckle boom crane"). An object of the invention is to present a crane which is lighter, more compact, and has improved operational characteristics, over the prior art cranes.

SUMMARY OF THE INVENTION

The invention is set forth and characterized in the main claim, while the dependent claims describe other characteristics of the invention.

It is thus provided a crane comprising:

- a main boom having a first end portion and a second end portion, and being supported by a support structure via a hinged connection whereby the main boom is pivotable in a vertical plane;
- a pivoting assembly arranged below the main boom, wherein the pivoting assembly comprises an electric motor-and-winch assembly, a sheave assembly, and one or more drive wires extending between the motor-and-winch assembly and the sheave assembly.

In one embodiment, the electric motor-and-winch assembly is arranged on an end portion of the main boom, and the sheave assembly is arranged on the support structure, or vice versa.

In one embodiment, the invention further comprises a secondary boom which is slidably connected to the main boom and arranged for translatory motion with respect to the main boom, wherein

- one or more power-and-transmission units connected to the main boom, wherein a power-and-transmission unit comprises a drive unit operatively connected to a first gear;
- at least a portion of the secondary boom comprising a second gear; and
- the first and second gears are dimensioned and configured for gripping engagement, whereby operation of the drive unit causes the secondary boom to move with respect to the main boom.

In one embodiment, the drive unit is an electric motor. The first gear may be a circular gear and the second gear may be a linear gear. In one embodiment, the secondary boom is slidably arranged inside at least a portion of the main boom.

In one embodiment, the crane comprises a pedestal having a slewing mechanism to which the support column is rotatably connected. The crane may comprise a main winch arranged on a the secondary boom. In one embodiment, the main winch comprises an electric motor. The crane is an all-electric crane, with no use of hydraulic actuators.

BRIEF DESCRIPTION OF THE DRAWINGS

These and other characteristics of the invention will become clear from the following description of an embodiment of the invention, given as a non-restrictive example, with reference to the attached schematic drawings, wherein.

DETAILED DESCRIPTION OF EMBODIMENTS OF THE INVENTION

Figure 1:
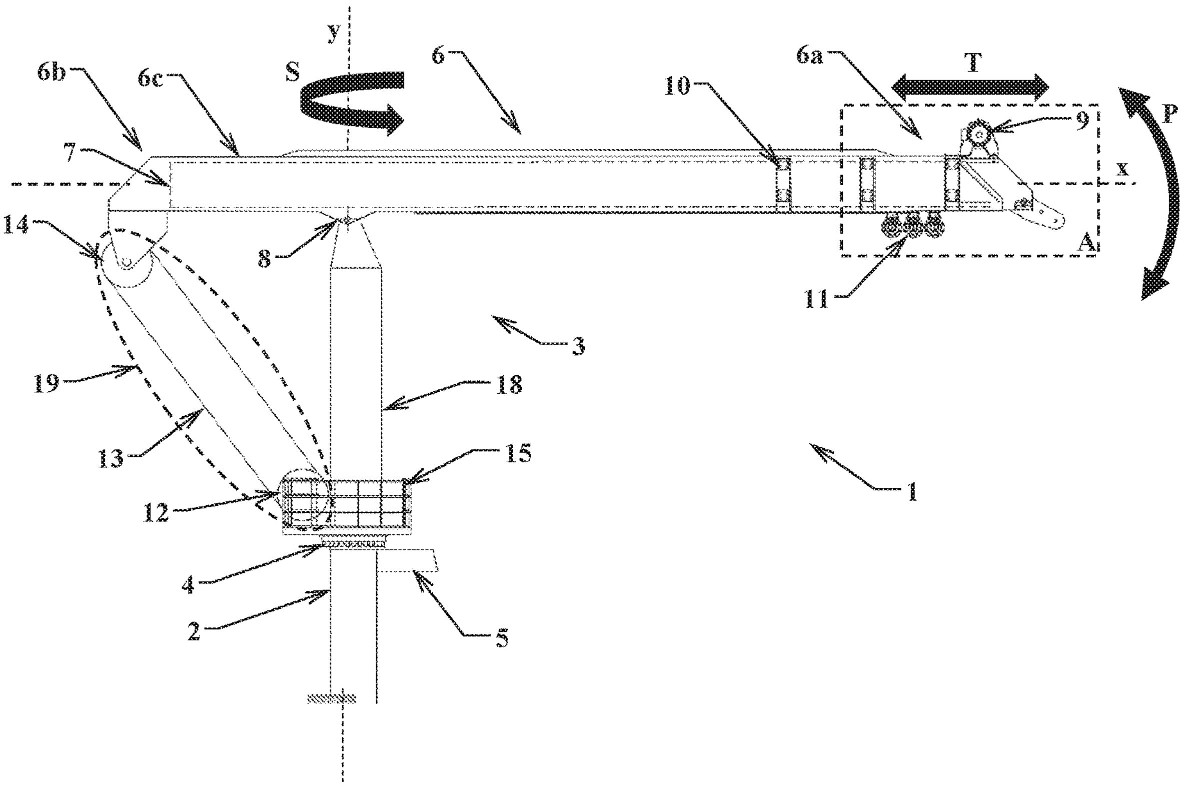
FIG. 1 is a side view of an embodiment of the crane according to the invention, where the main boom is drawn partly transparent in order to illustrate a secondary boom inside the main boom.

The following description may use terms such as "horizontal", "vertical", "lateral", "back and forth", "up and down", "upper", "lower", "inner", "outer", "forward", "rear", etc. These terms generally refer to the views and orientations as shown in the drawings and that are associated with a normal use of the invention. The terms are used for the reader's convenience only and shall not be limiting.

Figure 2:
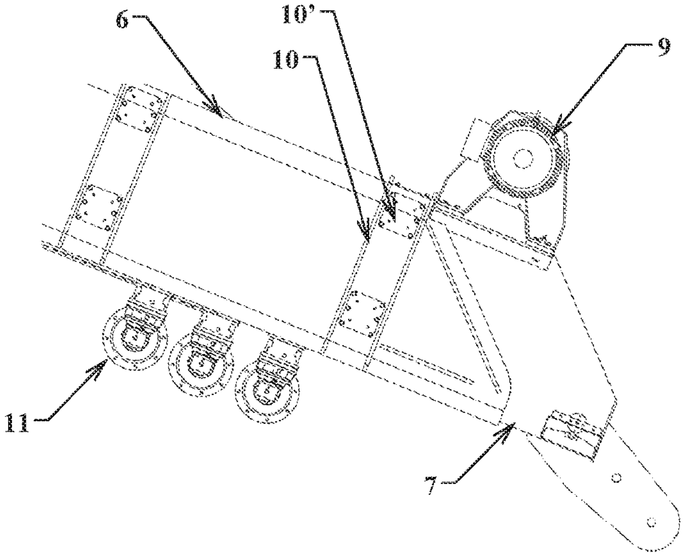
FIG. 2 is an enlarged drawing of the area "A" in FIG. 1.

Referring initially to FIG. 1 and FIG. 2, the crane 1 according to the invention comprises a superstructure 3 rotatably arranged on a pedestal 2. Rotating the superstructure around the pedestal vertical axis y is accomplished by the slewing mechanism 4, which is well known in the art. This slewing motion S is indicated by a left-hand arrow in FIG. 1, but it should be understood that the superstructure may be rotated also in the opposite direction. The pedestal comprises a boom rest 5 which is used for supporting a portion of the boom when the crane is not in operation. The pedestal is firmly connected to the deck (not shown) of a ship or other vessel, or to any other suitable foundation. Although the invented crane is particularly useful on a ship, it is equally applicable for use on a fixed foundation, onshore or at sea.

The superstructure 3 comprises a support structure 18, for example a column, to which the slewing mechanism is connected. In the upper end of the support structure, a hinged connection 8 is arranged, to provide a fulcrum and connecting the erect support structure to a main crane boom 6—for example by means of a bolt or pin, or any other device which is known in the art. A service platform 15 is arranged on the support column 18.

The main boom 6 comprises a first (forward) end portion **6*a* and a second (rear) end portion 6*b*. The hinged connection 8 is arranged closer to the second end portion than to the first end portion. In FIG. 1, reference number 6*c* designates the main boom portion between the hinged connection 8 and the second (rear) end portion 6*b*, and is referred to a the pivot interface portion 6*c***.

The crane comprises a pivoting assembly 19, whereby the main boom 6 may be rotated (pivoted) about the hinged connection 8, in a vertical plane, as indicated by the double arrow P in FIG. 1. The pivoting assembly 19 is arranged below the pivot interface portion **6*c*. In the illustrated embodiment, the pivoting assembly 19 comprises a motor-and-winch assembly 12 arranged on the support structure 18, a rotary attachment device (for example a sheave) 14 arranged at or near the main boom second end portion 6***b*), and one or more drive wires 13 extending between the motor-and-winch assembly 12. This pivoting assembly 19 enables pivoting motion P about the hinged connection 8. The drive wires 13 may be single or multi fall, depending on the application and operational requirements. A reversed arrangement is conceivable, i.e. where the motor-and-winch assembly is arranged on the boom and the sheave is arranged on the support structure. The motor in the motor-and-winch assembly 12 is preferably an electric motor.

In the illustrated embodiment, a secondary boom 7 is slidably connected to the main boom 6 and arranged for translatory motion T with respect to the main boom, along a main boom longitudinal axis x. In the illustrated embodiment, the main boom 6 is a box boom and the secondary boom 7 is slidably arranged inside at least a portion of the main boom 6. The secondary boom 7 is thus a telescopic boom, that may be retracted into and extended out from the main boom first end portion 6*a*. The main boom 6 may comprise one or more support structures 10 for the secondary boom, alternatively comprising friction-mitigating pads 10'.

Arranged at the free end of the secondary boom is a main winch, which is configured and dimensioned for hoisting and lowering a payload via a lifting wire (not shown). The main winch 9 may be powered by an electric motor.

Figure 4:
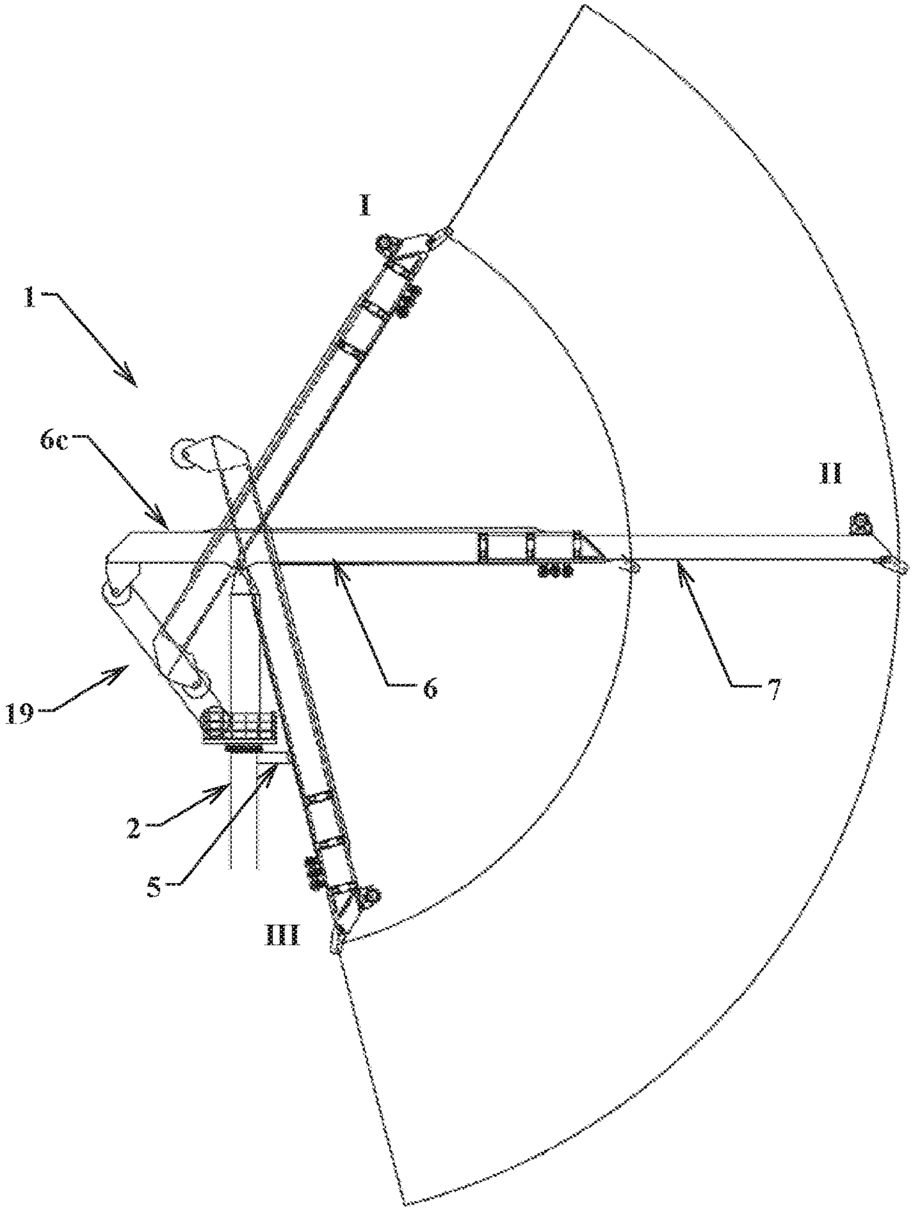
FIG. 4 is a side view of the crane illustrated in FIG. 1, in three different positions: fully raised and secondary boom retracted, intermediate and secondary boom extended, and fully lowered and secondary boom retracted.

The translatory motion T (here: telescopic) of the secondary boom is achieved by one or more power-and-transmission units 11 connected to the main boom. FIGS. 1, 2, and 4 show three such units, but the invention shall not be limited to this number. The power-and-transmission unit comprises a drive unit 11' operatively connected to a first gear 16, and at least a portion of the secondary boom comprises a second gear 17. The first and second gears are dimensioned and configured for gripping engagement, whereby operation of the drive unit 11' causes the secondary boom to move (translate T) with respect to the main boom.

Although, in the illustrated embodiment, the secondary boom 7 is shown as being arranged for telescopic movement inside a box boom 6, it should be understood that the main boom and secondary boom may be slidably interconnected in other configurations.

Figure 3:
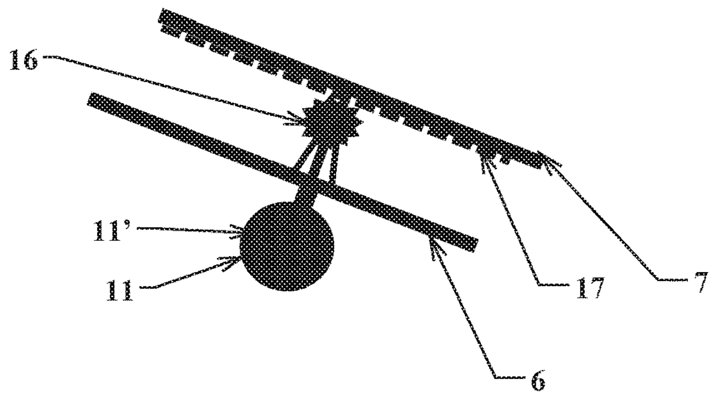
FIG. 3 is a sketch illustrating the principle of how the secondary boom may be moved with respect to the main boom.

Referring to FIG. 3, the first gear 16 is a circular gear and the second gear 17 is a linear gear, in combination a rack-and-pinion drive. The drive unit 11' is an electric motor, rotatably connected to the first gear.

Required power cables and other equipment for operating the electric motors described above are not described, as such are well known in the art.

Although not illustrated, it should be understood that a third boom may be arranged in relation to the secondary boom in a manner similar to how the secondary boom is arranged in relation to the main boom (and so on for a boom four, five, etc.).

In FIG. 4, the invented crane 1 is illustrated in three different angular positions: I—a fully raised positon, II—an intermediate positon, and III—a fully lowered position. In the positions I and III, the secondary boom 7 is fully retracted, while it is fully extended in position II. It should be understood that the secondary boom may be extended (completely or partly) at any angular position of the main boom. In its fully extended position, the secondary boom 7 may be extended completely beyond the hinged connection 8, i.e. on the side of the first (forward) end portion 6*a*. The main and secondary booms are balanced by the pivoting assembly (motor-and-winch assembly 12 and drive wires 13).

Position III may be used as a parking position when the crane is not in use, a portion of the main boom being supported by the boom rest 5.

FIG. 4 illustrates the versatility and improved operational range of the invented crane, compared to cranes of the prior art. One significant aspect of the invented crane, is that the pivoting assembly 19 is arranged below the main boom 6, and there is no tower or other element extending above the main boom. This allows for the extended operation envelope illustrated in FIG. 4. The electric motors and the associated gears and assemblies make hydraulic cylinders and a tower (normally extending above the main boom in cranes types of the prior art) superfluous. The electric motor in the pivoting assembly 19 also provides for instantaneous and stepless response when necessary. In a dynamic situation, for example when the crane is used for shifting cargo between vessels or between a vessel and a platform, the main boom is moving in the vertical plane. These movements may cause alternating tension and relaxation in the pivoting wires 13. The electric motor in the pivoting assembly 19 will be able to react instantaneously in order to compensate for the boom movements and maintain appropriate tension in the wires at all times, and thus preventing slack in the wires.

The main boom may be lowered much farther downwards and much closer to the pedestal 2 (position III) than cranes of the prior art, which means that an operator may move the boom close to a payload without having to pay out much of the lifting wire. The invented crane is also more compact when not in use, and occupies less deck space than a conventional tower crane.

As described above, the invented crane is all electrically powered, with no need for hydraulic actuators and associated equipment. The electric motors (and associated control system, not shown) allow for an improved three-dimensional control of the crane, with more accurate response times than traditional hydraulic cylinders. This is particularly relevant when the crane is installed on a ship or other vessel, where the ability to quickly control pivot P, slewing S, and telescoping T, is important to compensate for the ship's movement.

The invention claimed is:

1. A crane comprising:

a superstructure rotatably arranged on a pedestal, and the superstructure is rotatably connected to the pedestal via a slewing mechanism whereby the superstructure is configured to rotate around a vertical axis of the pedestal, wherein the superstructure comprises a support structure, the support structure supporting a main boom having a first end portion and a second end portion via a hinged connection, the hinged connection arranged closer to the second end portion than to the first end portion, and the main boom is pivotable, via the hinged connection, in a vertical plane; and a pivoting assembly arranged below the main boom, wherein the pivoting assembly comprises an electric motor-and-winch assembly, a sheave assembly, and one or more drive wires extending between the electric motor-and-winch assembly and the sheave assembly, wherein the electric motor-and-winch assembly is arranged at or near the second end portion of the main boom and the sheave assembly is arranged on the support structure, or vice versa, and wherein the pedestal comprises a boom rest configured to support a portion of the main boom when the crane is not in use.

2. The crane of claim 1, further comprising a secondary boom which is slidably connected to the main boom and arranged for translatory motion with respect to the main boom, wherein one or more power-and-transmission units are connected to the main boom, wherein a power-and-transmission unit of the one or more power-and-transmission units comprises a drive unit operatively connected to a first gear, wherein at least a portion of the secondary boom comprises a second gear, and wherein the first gear and the second gear are dimensioned and configured for a gripping engagement, whereby operation of the drive unit causes the secondary boom to move with respect to the main boom.

3. The crane of claim 2, wherein the drive unit is an electric motor.

4. The crane of claim 2, wherein the first gear is a circular gear and the second gear is a linear gear.

5. The crane of claim 2, wherein the secondary boom is slidably arranged inside at least a portion of the main boom.

6. The crane of claim 2, further comprising the pedestal having the slewing mechanism to which the support structure is rotatably connected.

7. The crane of claim 2, further comprising a main winch arranged on the secondary boom, wherein the main winch is configured and dimensioned for hoisting and lowering a payload via a lifting wire.

8. The crane of claim 7, wherein the main winch comprises an electric motor.

9. The crane of claim 2, wherein the secondary boom moves via more than one power-and-transmission units connected to the main boom.

10. The crane of claim 2, wherein the secondary boom moves via three power-and-transmission units connected to the main boom.

11. The crane of claim 2, wherein the first gear and the second gear form a rack-and-pinion drive.

12. The crane of claim 2, wherein an angular position of the crane comprises a raised position where the secondary boom is at least partially retracted.

13. The crane of claim 2, wherein an angular position of the crane comprises a lowered position where the secondary boom is at least partially retracted.

14. The crane of claim 13, wherein, when not in use, the crane is parked in the lowered position.

15. The crane of claim 2, wherein an angular position of the crane comprises an intermediate position where the secondary boom is at least partially extended.

16. The crane of claim 2, wherein, when fully extended, the secondary boom extends beyond the hinged connection.

17. The crane of claim 1, wherein the main boom comprises a box boom or friction-mitigation pads.

18. The crane of claim 1, wherein the pivoting assembly is arranged below the main boom.

19. The crane of claim 1, wherein no tower or other element of the crane extends above the main boom.

* * * * *